United States Patent Office 2,741,995
Patented Apr. 17, 1956

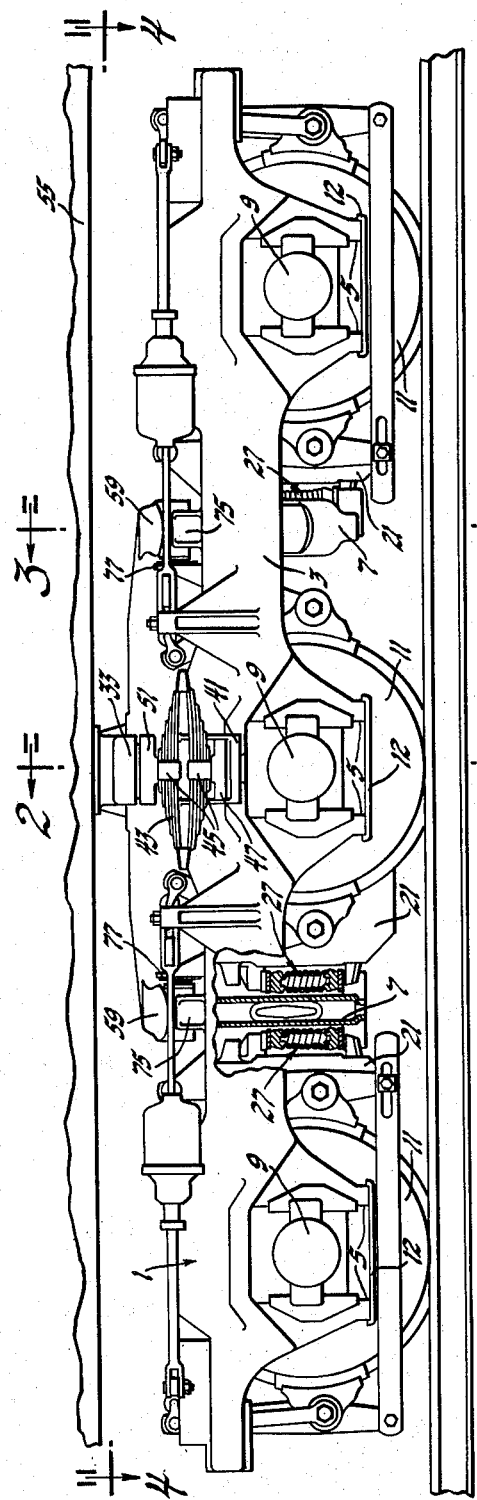

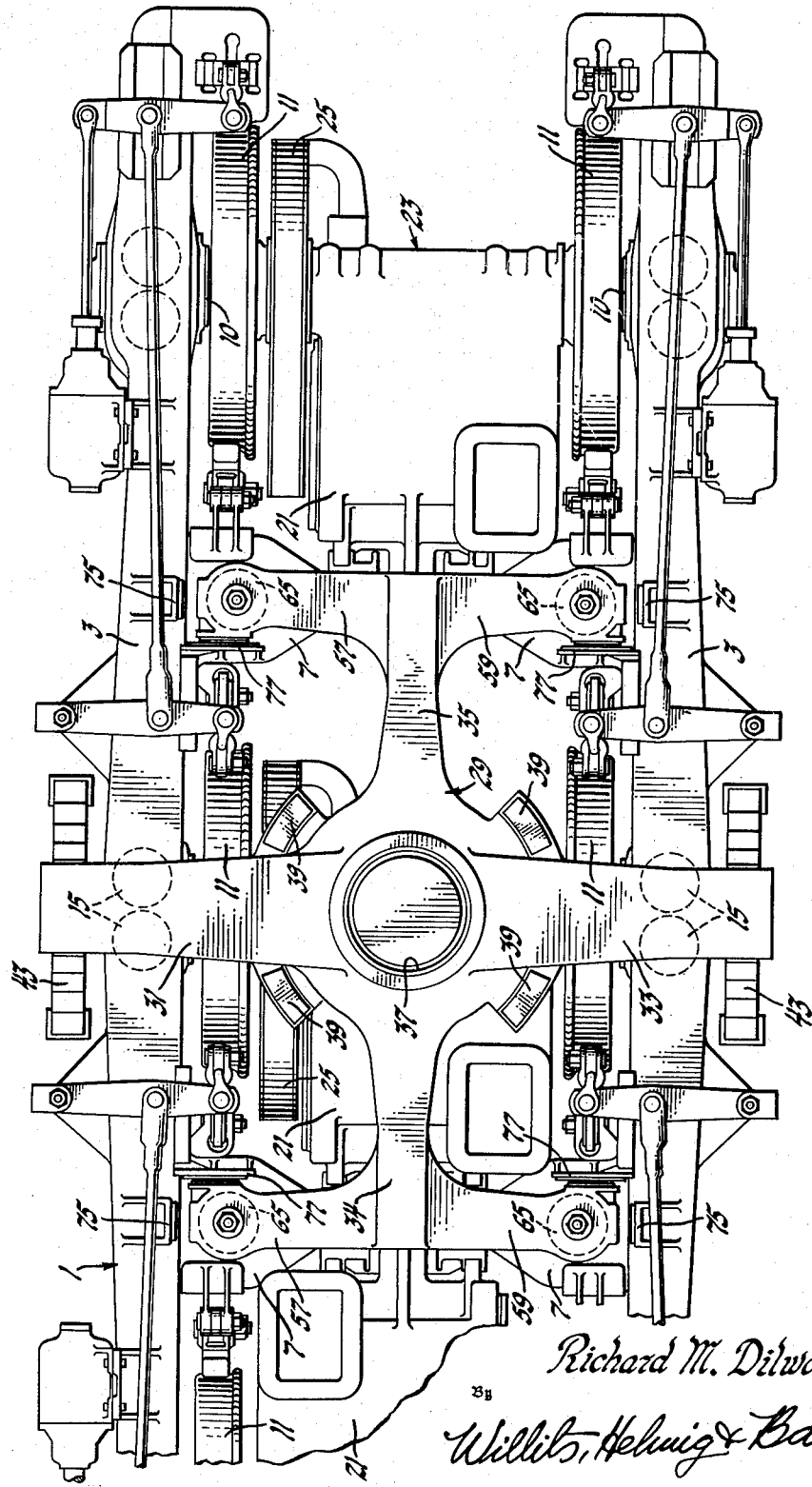

2,741,995

TRACTION TRUCK

Richard M. Dilworth, Hinsdale, Ill., assignor to General Motors Corporation, Detroit, Mich., a corporation of Delaware Application April 4, 1951, Serial No. 219,281

8 Claims. (Cl. 105—188)

This invention relates to railway vehicles and more particularly to traction trucks for locomotives.

The principal object of the invention is to provide a simple traction truck having a short length frame supported intermediate the ends and adjacent each end by springs and journal boxes carried by journals provided on the outer ends of each of three driving axles having attached driving wheels and a truck bolster supported for vertical and lateral movement on the truck frame by springs located at points on the transverse center line of the truck frame and spaced outwardly of the sides thereof and also supported by other springs located on the sides of the truck frame between adjacent driving axles, the location and also the combined characteristics of the truck frame and bolster supporting springs being such that damped vertical and lateral movement of the bolster results.

The combined means by which this object is accomplished together with other novel features of the invention will become apparent by reference to the following detailed description and drawings illustrating a locomotive truck embodying these features.

Figure 1 of the drawings is a side elevation view of the truck with parts shown broken away and in section.

Figure 2 is an enlarged transverse, vertical sectional view taken on line 2—2 of Figure 1 with parts shown broken away and in section.

Figure 3 is an enlarged transverse, vertical sectional view taken on line 3—3 of Figure 1 with parts shown broken away and in section.

Figure 4 is a top, plan view of the truck with parts broken away.

As best illustrated in the various figures of the drawings, the locomotive traction truck frame is generally indicated by the character reference 1. The truck frame 1 includes opposite side frame portions 3 each having three sets of vertical journal box pedestal guides 5 located intermediate the ends and adjacent each end and frame transom portions 7 extending transversely between the side frame portions 3 intermediate the adjacent pedestal guides 5. Journal boxes 9 are vertically guided in each set of pedestal guides 5 and are carried on the outer end journals of each of three axles 10 having driving wheels 11 secured thereto adjacent the journals. Journal box retainer bars 12 are secured between the lower ends of each set of pedestal guides 5 to prevent downward movement of the journal boxes 9 out of the guides. Elongated spring pockets 13 are provided in the side frame portions 3 above each set of pedestal guides 5. Two groups of springs, each group consisting of a pair of concentrically arranged helical springs 15 and 16 are located in parallel relation in each spring pocket 13 with the upper ends thereof in engagement with spring seats 17 in the pockets and the lower ends engaged in spring seats 19 on the upper portion of the journal boxes 9.

An electric traction motor 21, having conventional axle box bearings, generally indicated by the reference character 23, is supported at one side on each axle between the driving wheels and is operatively connected to drive the axle by means of gears, not shown, enclosed in a gear case 25 in conventional manner. Each traction motor is also provided with conventional nose support means on the opposite side shown connected with conventional resilient nose supporting means on each frame transom portion 7 and generally indicated by the reference character 27. It will be noted in Figure 1 that one traction motor nose supporting means 27 is provided on the outer face of one truck frame transom portion 7 and separate nose supporting means 27 are located on each face of the other transom member 7 for resiliently suspending one side of each motor and for absorbing the torque reaction thereof in conventional manner.

The truck bolster 29 is X-shaped, as viewed in Figure 4, and includes two transversely extending legs 31 and 33, two longitudinally extending legs 34 and 35 and a depressed center plate portion 37 of cylindrical form at the junction of these legs. Side bearing portions having arcuate shape wear plates 39 secured to the upper faces thereof are provided on the bolster in concentric relation with the center plate 37 and are located on opposite sides of the transversely extending bolster legs 31 and 33. Each of the transverse bolster legs 31 and 33 extend outwardly over each of the truck frame side portions 3 and the outer end of each of these legs is located directly above a projection 41 provided on the outer wall of the spring pocket 13 for each journal box 9 supported on the intermediate truck driving axle 10. A full elliptic spring 43 is vertically disposed outside and parallel to each truck side frame portion 3 between the outer end of each of the transverse bolster legs 31 and 33 and each of the truck side frame projections 41. The upper and lower leaf groups of each spring 43 is provided with an intermediate band 45. The lower spring band 45, as best seen in Figure 2, is seated in a spring seat 47 having a cylindrical groove in the lower face and extending longitudinally with respect to the truck frame and a seat 49 is seated in a socket of the truck frame projection 41 and is provided with an upstanding semi cylindrical pivot portion engaged in the groove of the spring seat 47. A similar seat 51 is placed on the upper spring band 45 and is also provided with a longitudinal groove in the upper face, extending longitudinally with respect to the truck frame, and a seat 53 is seated in a socket in the lower, outer end surface of each of the transverse bolster leg portions 31 and 33. The seats 53 are each provided with a semi-cylindrical pivot portion seated in the groove of one of the upper spring seats 51.

The depressed cylindrical bolster center plate portions 37 pivotally support a downwardly projecting cylindrical center plate, not shown, on one end of the locomotive underframe 55, shown in Figure 1, which is also provided with side bearings, not shown, cooperating with the wear plates 39 on the bolster side bearings. Bolster retaining hooks, not shown, are removably secured to the sides of the underframe side bearing portions and these hooks overlap the bolster side bearings to prevent vertical separation of the locomotive underframe from the truck bolster 29 in conventional manner.

The outer end of each of the longitudinal bolster legs 34 and 35 is provided with oppositely extending transverse end projections 57 and 59. The transverse end projections 57 and 59 are shown extending transversely above each of the truck frame transom portions 7. A spring pocket 61 is provided in the lower face of each of the bolster end projections 57 and 59 adjacent the ends thereof and each spring pocket 61 is shown in Figure 3 located directly above a deep spring pocket 63 provided in the upper face of a frame transom portion 7 adjacent each end thereof. The mouth of each of the transom spring pockets 63 is of elliptical form with the major diameter of the mouth extending transversely with respect to the truck frame. The bottom of each pocket 63 is located in vertical alignment with the mouth and is circular in form, having a diameter substantially equal to the minor diameter of the elliptical mouth and the wall of each pocket tapers between the mouth and bottom thereof. A helical bolster spring 65 is placed in each of the transom spring pockets 63 with the lower end of the spring engaging an annular spring seat 67 located in the bottom of the pocket and the upper end of the spring in engagement with a spring seat 69 of annular form located in a spring pocket 61 of each of the bolster end projections 57 and 59, as best shown in Figure 3. Vertically aligned openings are provided in each of the bolster and transom spring pockets 61 and 63 through which a bolster retaining bolt 71 is insertable and extends through each bolster spring 65 and the annular spring seats 69 and 67 therefor to prevent a vertical separation of the bolster relative to the truck frame. The bolt 7 has a nut threaded thereon to limit vertical separation movement between the frame 1 and bolster 29. Downward movement of the bolster 29 relative to the truck frame 1 is limited by upstanding stop members 73 located on each transom portion 7 inwardly of the spring pocket portion 63 therein. The stop 73 on each transom portion being engaged by downwardly extending portions adjacent thereto provided on the bolster end projections 57 and 59. Lateral motion of the bolster 29 relative to the truck frame 1 is limited by means of upstanding stops 75 provided on the truck frame side portions 3 adjacent the ends of the bolster end projections 57 and 59, these ends coming in contact with the stops 75 on the truck frame side portions to limit this lateral motion of the bolster. Longitudinal movement of the bolster 29 relative to the truck frame 1 is limited by upstanding stop members 77 provided on each end of each transom 7 and located immediately adjacent the vertical inner side surfaces of each of the bolster end projections 57 and 59 as best shown in Figures 1, 3 and 4. It will be evident that the tractive and braking force on the truck frame 1 is transmitted to bolster end projections 57 and 59 and these forces are transmitted through the bolster center plate 37 and center plate of the locomotive underframe 55 pivotally engaged therein.

In order to obtain equalization on each axle the journal box springs 15 and 16 preferably have a low rate. The bolster coil springs 65 are of greater rate than the journal box springs, and are designed to provide maximum side stiffness. The full elliptic springs 43 are preferably twice the rate of the bolster coil springs and the interleaf friction damps vertical movement of the bolster 29 relative to the truck frame 1.

I claim:

1. In a railway truck, a truck frame having journal boxes mounted for vertical movement in the sides and adjacent the ends and intermediate the ends thereof, a first set of springs located between each journal box and the frame, said frame having centrally located projections extending outwardly from the sides and pockets in the sides located longitudinally equi-distant on opposite sides of the central projection, a set of elliptical leaf springs pivotally connected to said projections and a third set of springs having ends confined in said pockets, a truck bolster movable laterally relative to said frame and supported at the ends on said third set of springs and pivotally supported intermediate the ends on said set of elliptical leaf springs and cooperating stops on said truck frame and bolster to limit relative transverse and longitudinal movement, therebetween, each of said spring sets having different characteristics.

2. In a railway truck, a truck frame having journal boxes mounted for vertical movement in the sides and adjacent the ends and intermediate the ends thereof, low rate journal springs located between the journal boxes and truck frame to equalize the load thereon, said frame having spring seats extending transversely outwardly from the sides intermediate the ends and spring seats located in the sides between the intermediate and end journal boxes, a pair of bolster elliptical leaf springs, each longitudinally disposed and pivotally supported on one of the intermediate spring seats outwardly of each side of the frame and of greater rate than the journal box springs, and bolster coil springs having a rate less than said elliptical leaf springs and greater than the journal box springs and having ends confined on the seats in the sides of the frame, and a truck bolster movable laterally relative to said frame and supported at the ends on the bolster coil springs and pivotally supported intermediate the ends on said bolster elliptical leaf springs.

3. In a railway truck, a truck frame having opposite side frame portions and longitudinally spaced truck frame transom portions extending transversely therebetween, each of said truck frame side portions having an intermediate journal box vertically slidable therein intermediate the transom portions and end journal boxes vertically slidable therein adjacent the ends, truck frame supporting springs located between the side frame portions and the journal boxes, each of said frame side portions also having an intermediate, transversely outwardly extending projection, an elliptical leaf spring pivotally attached to each of said projections, said frame transom portions having spring pockets in the ends thereof, coil springs having ends confined in each of said pockets, a truck bolster movable laterally relative to said frame and supported at the ends on the coil springs in said pockets and pivotally supported intermediate the ends on said elliptical leaf springs, and cooperating stops on the truck frame and bolster for limiting transverse and longitudinal relative movement therebetween.

4. In a railway truck, a truck frame having journal boxes mounted for vertical movement in each side adjacent the ends and intermediate the ends thereof, opposite end and intermediate wheeled axles having outer end journals supporting the truck frame journal boxes, sets of concentric journal box coil springs positioned between the journal boxes and frame for equalizing the load thereon, said frame having projections extending outwardly from opposite sides intermediate the ends and spring seats in the sides between the intermediate and the end axles, a full elliptic bolster leaf spring having upper and lower seat members pivoted about axes parallel to the longitudinal axis of the truck frame, said lower seat members being supported on the intermediate frame projections, a bolster coil spring located and having an end confined on each frame side seat, a truck bolster laterally movable relative to said frame and having transverse end projections supported on the bolster coil springs and having transverse projections intermediate the end projections and supported on the upper seat members of the bolster leaf spring, and cooperating stops on the frame and bolster to limit relative transverse and longitudinal movement therebetween.

5. In a railway truck, a truck frame having central spring supporting projections extending outwardly from each side and spring pockets located in each side, equi-distant and on opposite sides of the central projection, and a pair of upwardly projecting stops on said frame located adjacent each spring pocket, one of said stops facing longitudinally outwardly toward each pocket and the other of said stops facing transversely inwardly toward each pocket, a truck bolster having transverse projections at each end located over each spring pocket and engageable with said frame stops to control longitudinal and transverse movement of said bolster relative to the frame, a coil spring having an end confined in each pocket and engaging a bolster end projection and supporting said bolster means interconnecting each bolster end projection with the frame and having means thereon engageable therewith to limit relative vertical separation movement of the bolster relative to the frame said bolster also having transverse projections intermediate the end projections and extending over the sides of the frame and the central spring supporting projections thereon and a full elliptic leaf spring pivotally connected for transverse rocking movement with each central frame projection and an intermediate transverse projection of the bolster, the leaf springs normally supporting one half of the total load on the bolster.

6. In a railway truck, a truck frame having bolster side spring supports projecting outwardly from the center of each side of the frame, spring pockets in the sides of the frame located equi-distant and on opposite sides of the central projecting side supports, a bolster laterally movable relative to said frame and having transversely projecting end portions provided with spring seats in the ends and located above the frame spring pockets and transversely extending projections intermediate the end projections and located above the projecting frame side supports, a coil spring having an end confined in each pocket and having an opposite end confined in a bolster end seat and a pair of elliptical leaf springs, each having an upper and a lower pivoted spring seat member engageable with an intermediate bolster projection and a projecting side support of the truck frame, said spring and the pivot axes of the pivoted spring seat members being longitudinally disposed, said frame having upstanding longitudinally outwardly facing stops located immediately adjacent the inner side of each transverse end portion of the bolster to limit relative longitudinal movement of the bolster relative to the frame and said frame also having upstanding transversely inwardly facing stops adjacent the outer end face of each transverse bolster end portion to control the extent of transverse movement relative to the frame.

7. In a railway truck, a truck frame having transversely outwardly extending spring supports on each side located in the transverse center plane thereof and spring pockets in each side located in transverse planes equi-distant and on opposite sides of the transverse center plane, said pockets having a horizontal bottom seat and upwardly diverging, transversely disposed side walls, a bolster laterally movable relative to said frame and having a depressed center plate portion and transversely and longitudinally oppositely extending leg portions, the outer ends of said transversely extending leg portions being located directly above the side frame spring supports, a full elliptic leaf spring having upper and lower pivoted seat members, each spring and the pivot axes of the pivoted seat members being located in a longitudinal vertical plane, the lower seat members being supported in a frame support and the upper seat members supporting the outer end of a transverse bolster leg, the outer ends of each longitudinal bolster leg having transversely extending end projections located over each spring pocket, a helical spring interposed between and having opposite ends confined to the bottom of each pocket and a transverse bolster end projection, transversely inwardly facing stops on the frame spaced adjacent the outer end face of each transverse bolster end projection and longitudinally outwardly facing stops immediately adjacent the inner side of each transverse bolster end projection for limiting transverse and longitudinal movement of the bolster and springs relative to the truck frame.

8. In a railway traction truck, a truck frame having side frame portions provided with journal boxes slidable vertically in each end and intermediate the ends and frame transom portions extending transversely between the side frame portions intermediate the end and intermediate journal boxes, sets of concentric journal box springs between each journal box and frame side portions, each side frame portion having a transversely outwardly extending projection located above the intermediate journal box and a spring pocket adjacent the end of each transom portion, each pocket having upwardly diverging, transversely disposed side walls, and a horizontal bottom spring seat, a truck bolster laterally movable relative to said frame and having a center plate with transverse legs extending over the side frame projections and longitudinal legs provided with transverse end projections located above the frame transom portions and provided with spring seats located above the spring pockets, a bolster coil spring between and having opposite ends confined to the bottom of each pocket and seat of each bolster end projection, bolster retaining means extending through each bolster coil spring, spring seat and spring pocket to limit vertical separation movement of the bolster relative to the truck frame, a pair of full elliptic bolster leaf springs having upper and lower pivoted seat members, the lower seat members of each leaf spring being supported on a side frame projection and the upper seat members supporting a transverse leg of the bolster, each of said leaf springs and the pivot axes of the seat members therefor being located in a plane parallel to the longitudinal center plane of the truck frame, said truck frame and each of bolster end projections having cooperating, transversely and longitudinally facing stop members for limiting relative transverse and longitudinal movement of the bolster and truck frame.

References Cited in the file of this patent

UNITED STATES PATENTS

| | | |
|---|---|---|
| 661,432 | Van Dorn | Nov. 6, 1900 |
| 1,347,887 | Barber | July 27, 1920 |
| 1,434,830 | Lamont | Nov. 7, 1922 |
| 2,475,327 | Keller | July 5, 1949 |
| 2,515,812 | Waldvogel et al. | July 18, 1950 |
| 2,530,495 | Waldvogel | Nov. 21, 1950 |